United States Patent
Hsieh

(10) Patent No.: US 6,766,995 B1
(45) Date of Patent: Jul. 27, 2004

(54) ADJUSTING DEVICE FOR A STAND

(76) Inventor: Wu-Hong Hsieh, No. 162, Chung Shan 2nd Rd., Lu Chou City, Taipei Hsien (TW)

(*) Notice: Subject to any disclaimer, the term of this patent is extended or adjusted under 35 U.S.C. 154(b) by 0 days.

(21) Appl. No.: 10/419,891

(22) Filed: Apr. 22, 2003

(51) Int. Cl.⁷ ............................................. F16M 11/00
(52) U.S. Cl. .................................... 248/404; 248/422
(58) Field of Search ................................ 248/422, 157, 248/329, 330.1, 332, 404, 421, 125.1, 161; 74/425, 415, 89.14

(56) References Cited

U.S. PATENT DOCUMENTS

| | | | | |
|---|---|---|---|---|
| 4,635,565 A | * | 1/1987 | Novak | 108/147 |
| 5,385,323 A | * | 1/1995 | Garelick | 248/161 |
| 6,119,605 A | * | 9/2000 | Agee | 108/147 |
| 6,279,860 B1 | * | 8/2001 | Swanger | 248/125.2 |
| 6,311,705 B1 | * | 11/2001 | Ma | 135/20.3 |
| 6,450,462 B1 | * | 9/2002 | Hsieh | 248/125.1 |
| 6,659,417 B2 | * | 12/2003 | Hsieh | 248/404 |

* cited by examiner

*Primary Examiner*—Leslie A. Braun
*Assistant Examiner*—Amy Sterling
(74) *Attorney, Agent, or Firm*—Bacon & Thomas, PLLC

(57) ABSTRACT

An adjusting device used for a stand with a base and an equipment stand is composed of a three-part telescoping post, a primary actuator, a secondary actuator, a driving device and at least one cable. The driving device is mounted in the primary actuator and directly raises or lowers one part of the three-part telescoping post. Each cable is securely attached to two parts of the three-part telescoping post and reeves over and around guide rollers mounted in the secondary actuator so the inner post is raised or lowered simultaneously with the middle post to increase the speed and stability of adjusting the stand.

8 Claims, 6 Drawing Sheets

ADJUSTING DEVICE FOR A STAND

BACKGROUND OF THE INVENTION

1. Field of the Invention

The present invention relates to an adjusting device for a stand, and more particularly to an adjusting device for a stand with an adjustable height, which adjusts the height of the stand quickly and easily.

2. Description of Related Art

Conventional adjustable stands with an adjustable height are used to hold objects such as drums, speakers and other heavy auxiliary equipment for performers. The stands usually have telescoping posts and fastening devices mounted at joints in the telescoping posts to adjust the heights of the stands.

With reference to FIG. 6, a conventional securing device (60) for telescoping posts (not numbered) of a stand with adjustable height is composed of a compression tube (61). Each telescoping post is composed of an upper post (50) and a lower post (51). The upper post (50) is slidably mounted inside the lower post (51). The compression tube (61) is divided into an adjusting compression ring (613) and a stationary compression ring (614) by an annular slit (611). The annular slit (611) extends more than half way around the compression tube (61) to allow the adjusting compression ring (613) and the stationary compression ring (614) to be tightened separately. The adjusting compression ring (613) is mounted around the upper post (50), and a stationary compression ring (614) is mounted around the lower post (51). A longitudinal slit (612) intersecting the annular slit (611) is defined through the compression rings (613, 614) to allow the rings (613, 614) detachably squeeze the upper post (50) or the lower post (51). Two ears (not numbered) are formed on each ring (613, 614) respectively on opposite sides of the longitudinal slit (612). One ear on each ring (613, 614) has a smooth through hole (not shown), and the other ear has a threaded hole (not numbered) aligned with the smooth through hole.

The stationary compression ring (614) is attached to the lower post (51) by passing a bolt (not numbered) though the smooth through hole and screwing the bolt into the threaded through hole until the stationary compression ring (614) securely clamps the lower post (51). The stationary compression ring (614) is attached to the lower post (51) near the joint between the lower post (51) and the upper post (50) so the adjusting compression ring (613) can be attached to the upper post (50).

The adjusting compression ring (613) is attached to the upper post (50) by passing a bolt (not numbered) with a knob (615) attached to one end though the smooth through hole and screwing the bolt into the threaded through hole until the adjusting compression ring (614) securely clamps the upper post (50). The knob (615) is turned to cause the adjusting compression ring (613) to clamp the upper post (50) in position relative to the lower post (51) or release the upper post (50) so the upper post (50) can be adjusted relative to the lower post (51).

However, the conventional adjustable stand of fastening device (60) with telescoping posts is inconvenient to use. When the knob (615) is turned to release the upper post (50), the upper post (50) has to be held to keep the upper post (50) from falling downward rapidly, especially when the stand is supporting heavy or expensive objects. However, holding the upper post (50) in place while it is supporting a heavy load may be particularly difficult.

To overcome the shortcoming of the above conventional adjustable stand, a conventional adjusting device uses a rack and pinion-like device to directly engage the telescoping posts to adjust the height of the stand gradually. Even though the upper post will not drop rapidly, the telescoping posts move slowly so adjusting the stand is time-consuming.

The present invention has arisen to mitigate or obviate the disadvantages of the conventional adjustable stand and the conventional adjusting device for a stand.

SUMMARY OF THE INVENTION

The main objective of the present invention is to provide an adjusting device for a stand, which adjusts the stand quickly and conveniently.

Further benefits and advantages of the present invention will become apparent after a careful reading of the detailed description with appropriate reference to the accompanying drawings.

DETAILED DESCRIPTION OF THE PREFERRED EMBODIMENT

Figure 1:
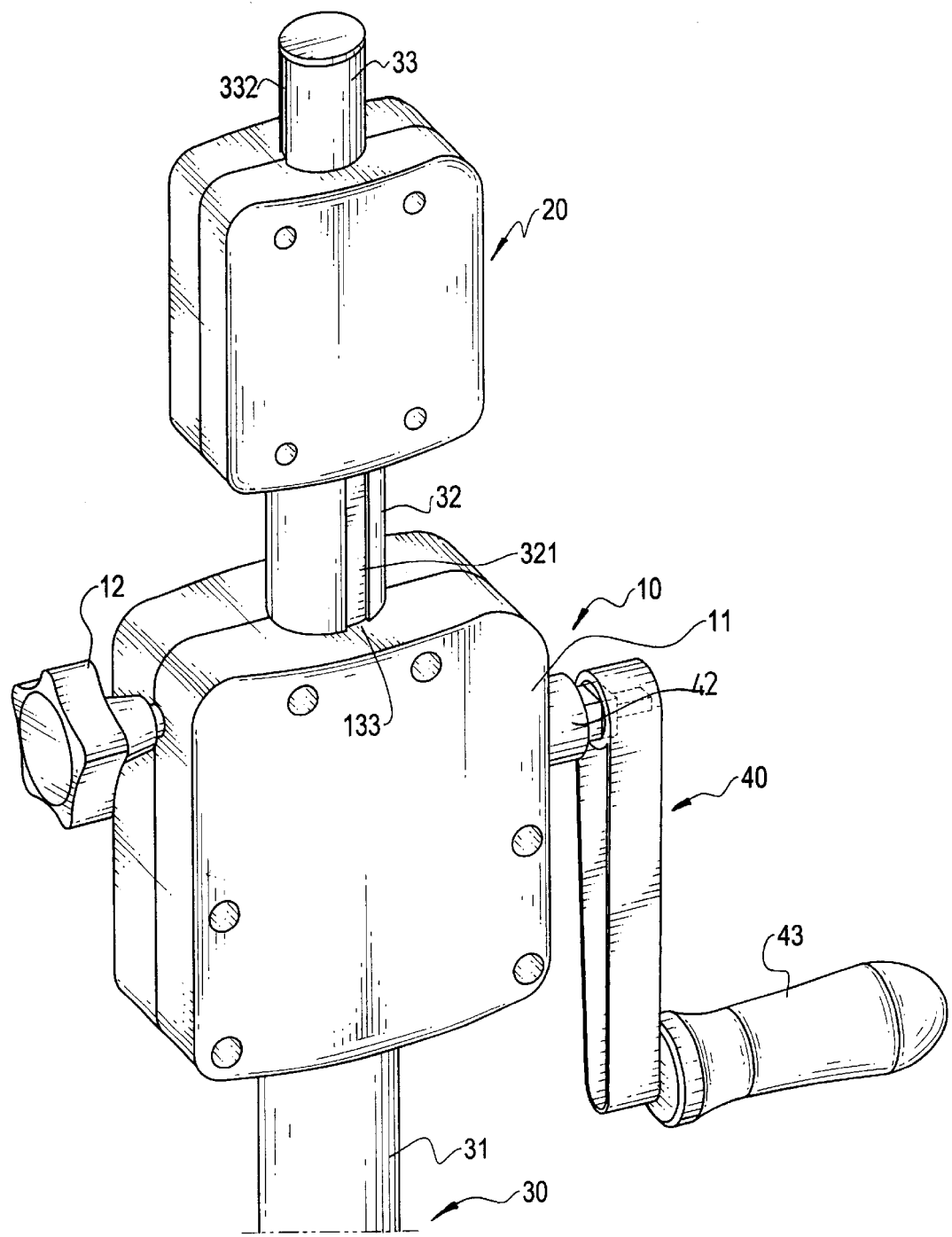
FIG. 1 is a perspective view of an adjusting device for a stand in accordance with the present invention.
Figure 3:
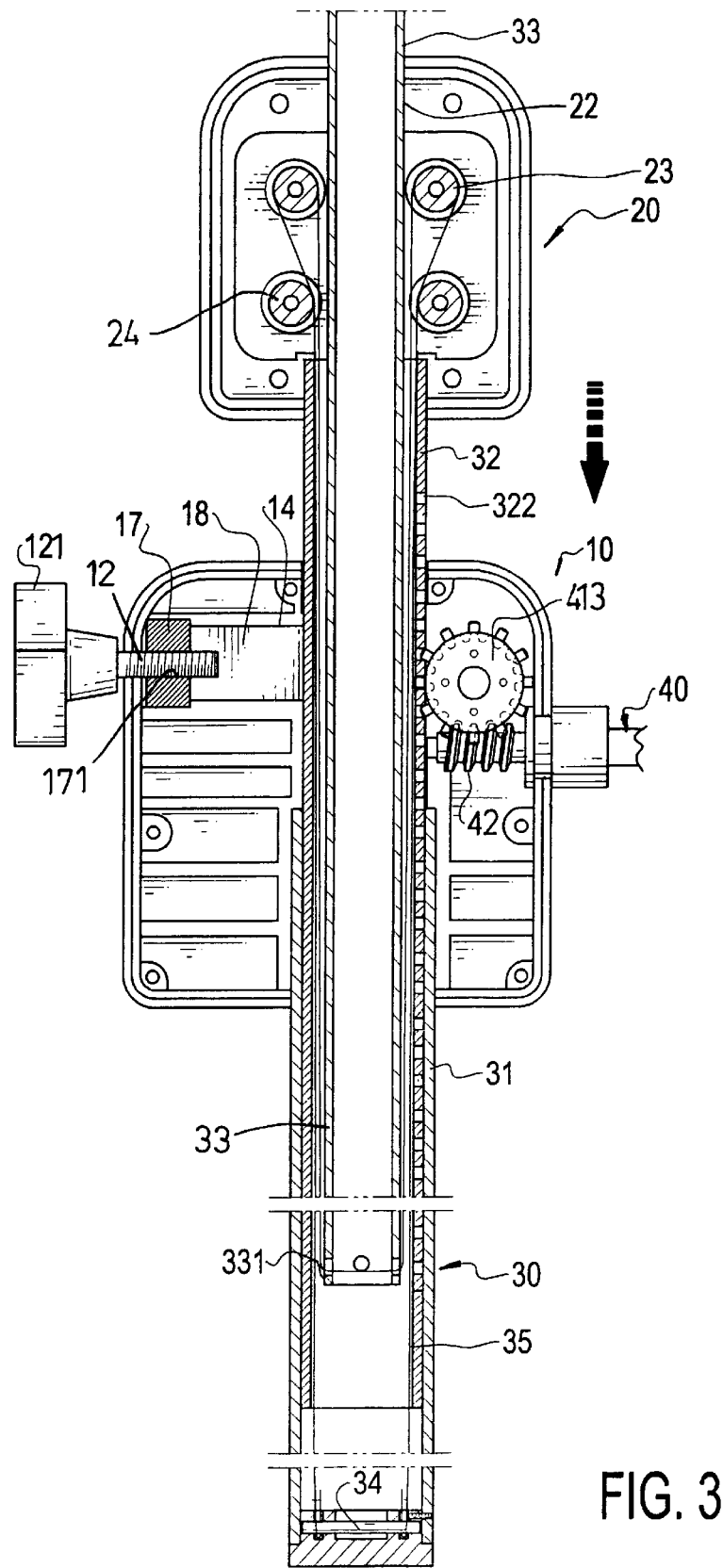
FIG. 3 is a front plan view in partial section of the adjusting device for a stand in FIG. 1 with the covers removed.

With reference to FIGS. 1, and 3, an adjusting device in accordance with the present invention for a stand with an adjustable height comprises a three-part telescoping post (30), a primary actuator (10), a secondary actuator (20), a drive assembly (40) and at least one cable (35).

With further reference to FIG. 3, the three-part telescoping post (30) comprises an outer post (31), a middle post (32) and an inner post (33).

The outer post, (31) is hollow and has a top end (not numbered), a bottom end (34) and an outside surface (not numbered).

The middle post (32) is hollow, has a top end (not numbered), multiple sprocket holes (322), a keyway (321), an outside surface (not numbered), an inside surface (not numbered) and an inside diameter (not numbered) and is slidably mounted inside the outer post (31). The sprocket holes (322) are defined longitudinally in the middle post (32) The keyway (321) is defined longitudinally in the outside surface of the middle post (32).

The inner post (33) is hollow, has a bottom end (331), an outside surface (not numbered), two keyways (332), an outside diameter (not numbered) and a cable connector (not numbered) and is slidably mounted inside the middle post (32). The two keyways (332, shown in FIG. 2) are formed longitudinally in the outside surface on diametrically opposite sides of the inner post (33). The outside diameter of the inner post (33) is smaller than the inside diameter of the middle post (32) so a gap is formed between the outside surface of the inner post (33) and the inside surface of the middle post (32). The cable connector is formed at the bottom end (331) of the inner post (33)

Figure 2:
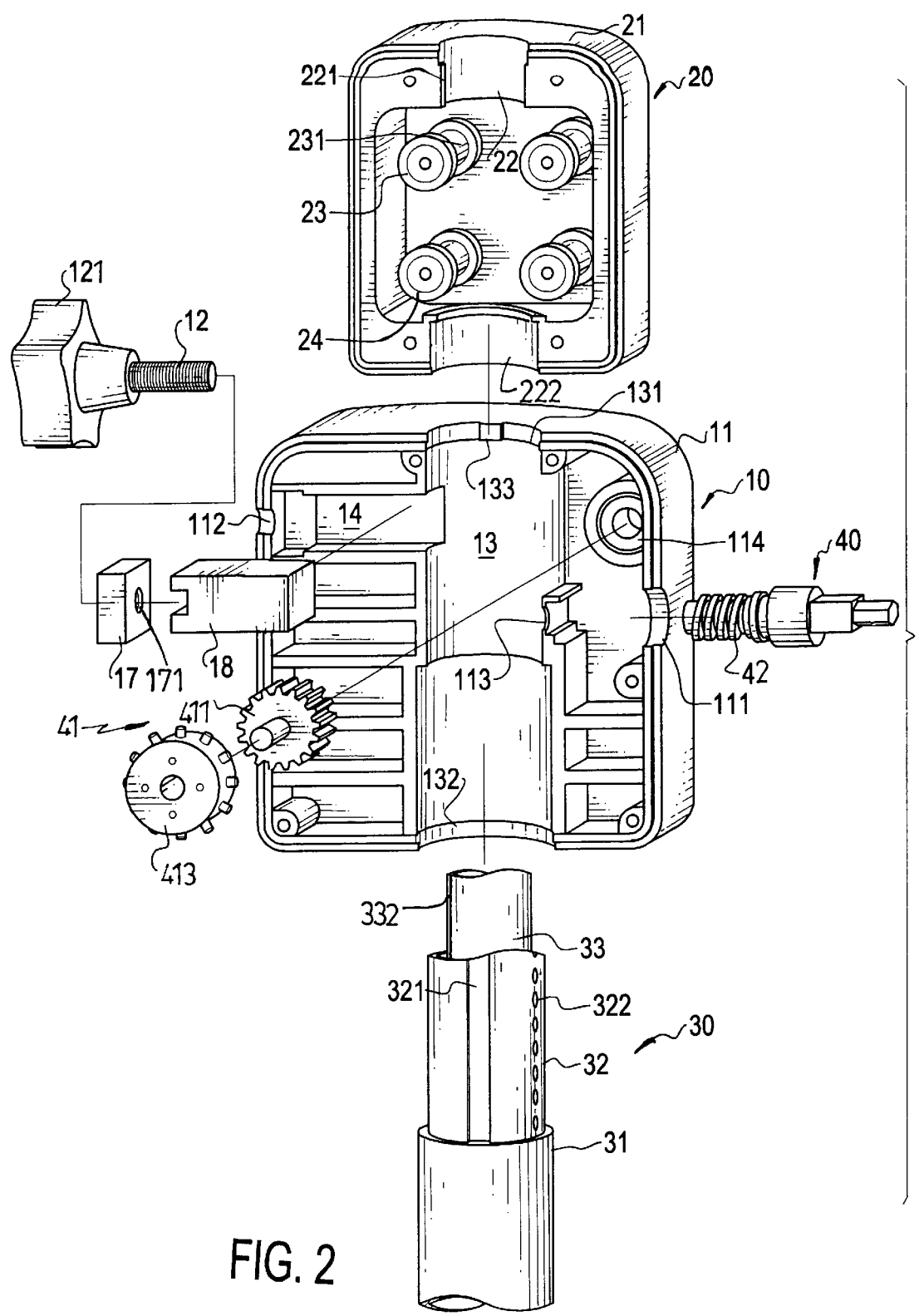
FIG. 2 is an exploded perspective view of the interior of the adjusting device in FIG. 1.

With further reference to FIG. 2, the primary actuator (10) comprises a housing (11), a drive assembly (40) and a locking assembly (not numbered).

The housing (11) comprises a front cover (not numbered) and a rear cover (not numbered) that are complementary. Each cover has an inner cavity (not numbered), a front face (not numbered), a top face (not numbered), a bottom face (not numbered), two side faces (not numbered), a drive hole (111), a post hole (13), a spindle bracket (113), a bearing (114) and a lock recess (14). The drive hole (111) is defined in one side face, and the locking hole (112) is defined in the other side face of the primary actuator (10). The post hole (13) is defined through the top face, the bottom face and the inner cavity of the primary actuator (10) and has an upper portion (not numbered) and a lower portion (not numbered). The upper portion has a diameter smaller than a diameter of the lower portion and forms a through hole (131) with a key (133) in the top face. The middle post (32) slidably extends through the upper portion of the post hole (13) and the through hole (131). The key (133) protrudes radially inward from edges of the through hole (131) into the keyway (321) in the middle post (32). The lower portion of the post hole (13) has a securing hole (132) formed through the bottom face. The top end of the outer post (31) passes through the securing hole (132) and is mounted securely in the lower portion of the post hole (13). The spindle bracket (113) is formed in the inner cavity and has a semicircular pivot hole (not numbered). The semicircular pivot hole aligns with the drive hole (111) when the front cover of the housing (11) is attached to the rear cover. The bearing (114) protrudes from the inner cavity of the housing (11) near the spindle bracket (113). The lock recess (14) is formed between and communicates with the locking hole (112) and the upper portion of the post hole (13).

The locking assembly selectively locks the three-part telescoping post (30) in position and comprises a stationary block (17), a locking block (18) and a threaded rod (12). The stationary block (17) is immovably mounted in the lock recess (14) adjacent to the locking hole (112) and has a threaded hole (171) aligned with the locking hole (112). The locking block (18) is slidably mounted in the lock recess (14) between the stationary block (17) and the post hole (13). The threaded rod (12) has a distal end (not numbered), a proximal end (not numbered) and a knob (121). The knob (121) is securely mounted on the proximal end, and the distal end passes through the locking hole (112), screws through the threaded hole (171) in the stationary block (17) and selectively presses the locking block (18) against the middle post (32) of the three-part telescoping post (30).

The secondary actuator (20) comprises a housing (21) and at least one pair of guide rollers (23).

The housing (21) comprises a front cover (not numbered) and a rear cover (not numbered) that are complementary. Each cover has an inner cavity (not numbered), a front face (not numbered), a top face (not numbered), a bottom face (not numbered), an upper hole (22), a lower hole (222) and a post passage (not numbered). The upper hole (22) is defined through the top face and has two keys (221). The keys (221) are formed on and protrude inward from diametrically opposite sides of the upper hole (22). The inner post (33) of the three-part telescoping post (30) is slidably mounted through the upper hole (22), and the keys (221) protrude into and slide in the keyways (332) in the inner post (33) to hold the inner post (33) steady. The lower hole (222) is defined through the bottom face coaxially with the upper hole (22) and has a stop (not numbered) formed on top edge of the lower hole (222). The post passage is defined inside the inner cavity between the upper hole (22) and the lower hole (222) to accommodate the inner post (33) of the three-part telescoping post (30). The lower hole (222) has a larger diameter then the upper hole (22) and securely holds the top end of the middle post (32) of the three-part telescoping post (30).

One pair of first guide rollers (23) is mounted rotatably and respectively inside the inner cavity at two opposite sides of the post passage. Each first guide roller (23) has an annular cable groove (231) to hold the at least one cable (35) on the guide roller (23). Alternatively, another pair of second guide rollers (24) is attached inside the inner cavity below the pair of first guide rollers and each second guide roller (24) also has an annular cable groove (241)

The driving device (40) is mounted in the primary actuator (10) and comprises a driver (41), a worm gear (42) and a crank (43). The driver (41) is composed of a spur gear (411) and a sprocket wheel (413). The spur gear (411) has an axial shaft (not numbered) protruding outward. The axial shaft has a first end (not numbered) and a second end (not numbered). The first end is rotatably mounted in the bearing (114), and the sprocket wheel (413) is attached securely to the second end. The sprocket wheel (413) has multiple sprockets (not numbered). The sprockets extend radially from the sprocket wheel (413) and selectively engage the sprocket holes (322) in the middle post (32) of the three-part telescoping post (30). The worm gear (42) has a distal end (not numbered) and a proximal end (not numbered), and is rotatably mounted in the primary actuator (10) to engage and drive the spur gear (411). The proximal end of the worm gear (42) protrudes out of the drive hole (111), and the distal end is rotatably attached to the spindle bracket (113). The crank (43) is attached to the proximal end of worm gear (42) to rotate the worm gear (42) by turning the crank (43).

The cable (35) is made of metal wire, has two ends and simultaneously raises or lowers the inner post (33) as the middle post (32) is raised or lowered. One end of the cable (35) is attached to the bottom end (34) of the outer post (31). The cable (35) then passes through the gap between the middle post (32) and the inner post (33), passes into the inner cavity in the secondary actuator (20) and reeves over the wire groove (241) of the second guide roller (24) and around the wire groove (231) of the first guide roller (23) at one opposite side relative to the post passage. Then, the cable (35) passes back into the gap between the inner post (33) and the middle post (32) and is securely attached to the cable connector at the bottom end (331) of the inner post (33). In order to pull the inner post (33) evenly, the cable (35) is constructed in the same manner at the other opposite and passes through the cable connector, and passes through the gap between the middle post (32) and the inner post (33), passes into the inner cavity in the secondary actuator (20) and reeves over the wire groove (241) of the second guide roller (24) and around the wire groove (231) of the first guide roller (23) at the other opposite side relative to the post passage. Lastly, the cable (35) passes back into the gap between the inner post (33) and the middle post (32) and is securely attached to the bottom end (34) of the outer post (31).

Figure 4:
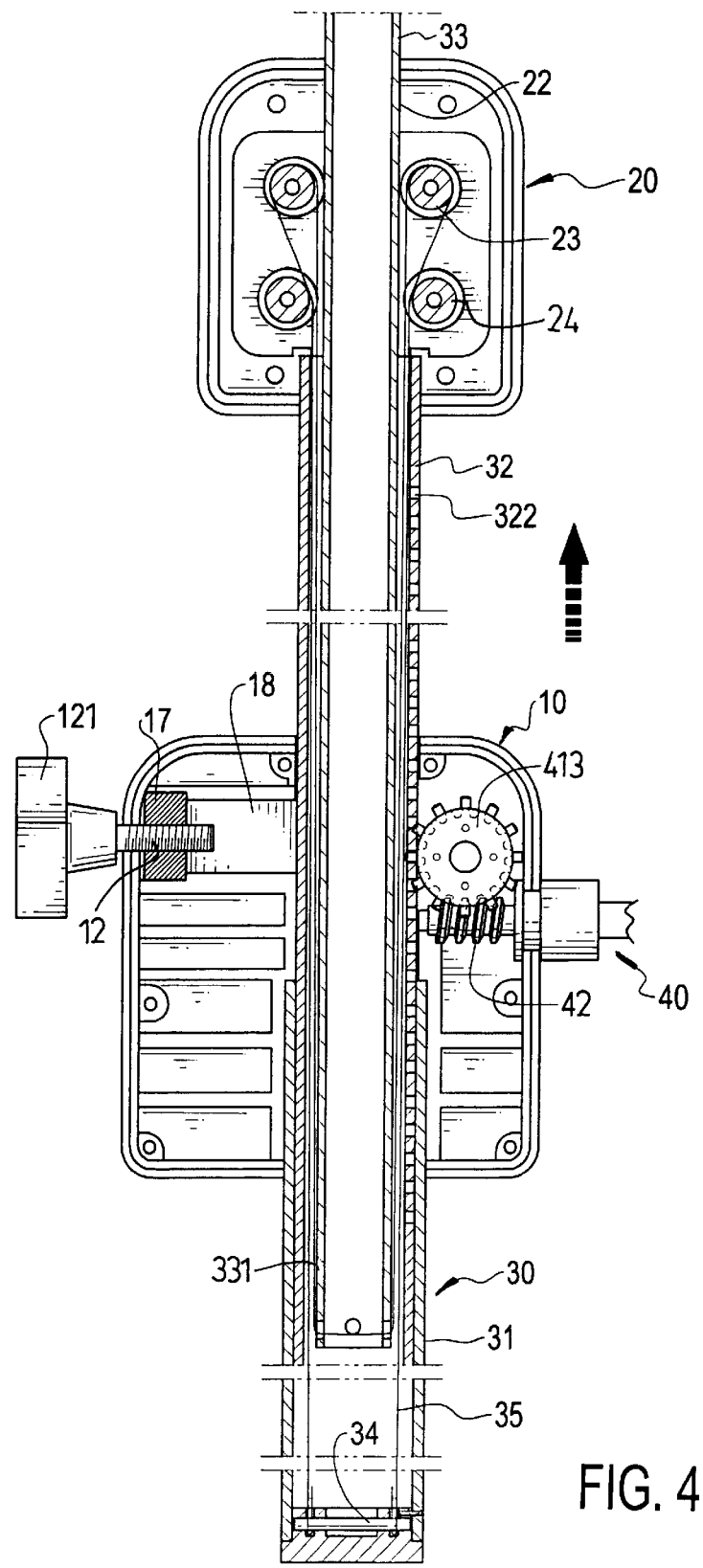
FIG. 4 is an operational front plan view in partial section of the adjusting device for a stand in FIG. 3.
Figure 5:
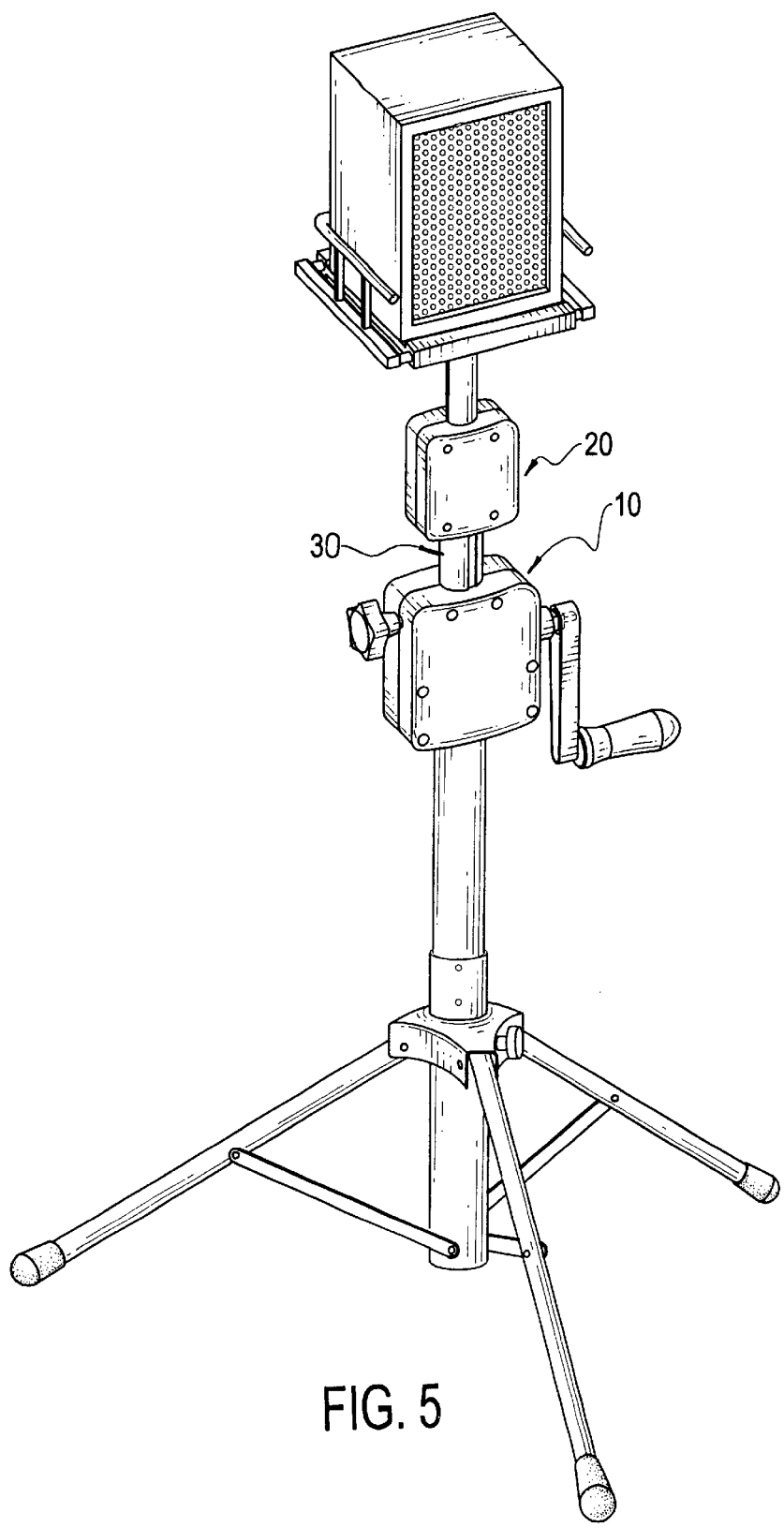
FIG. 5 is a perspective view of a stand with the adjusting device in FIG. 1 in use.
Figure 6:
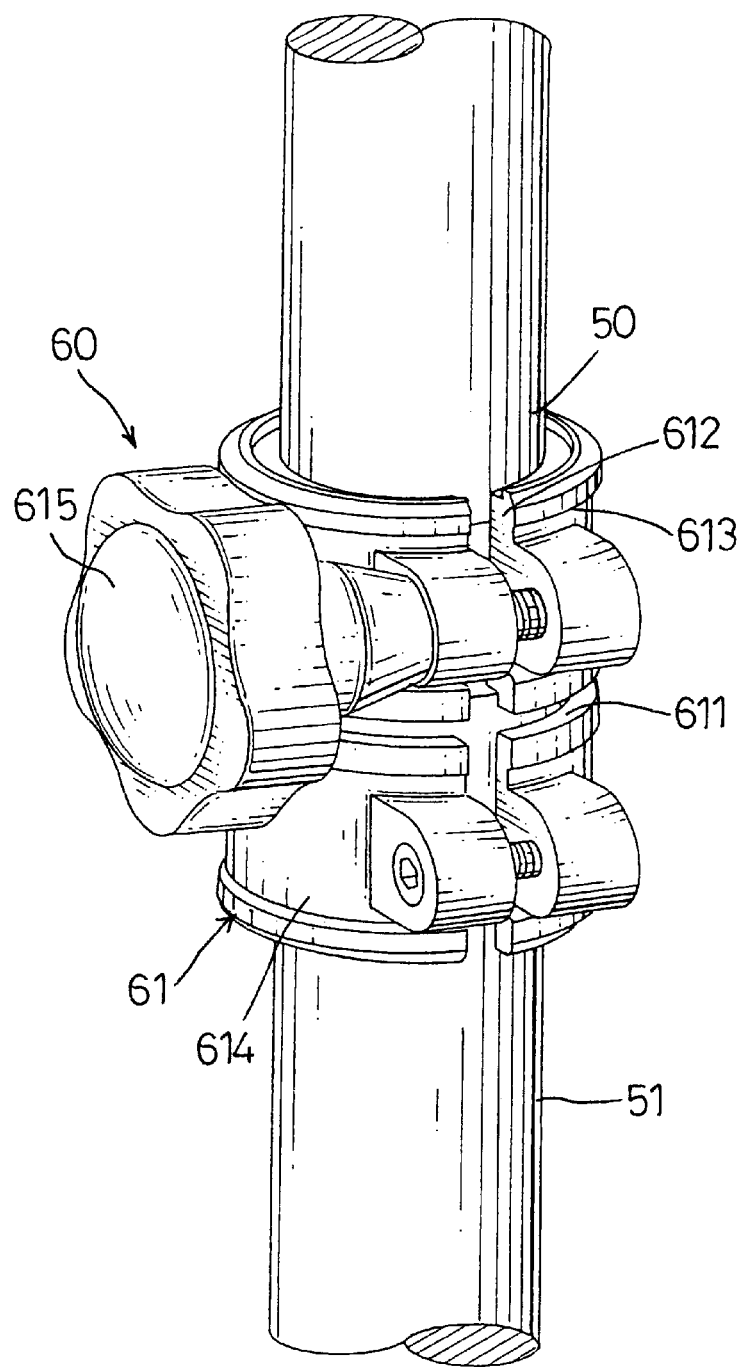
FIG. 6 is a perspective view of a conventional adjusting device in accordance with the prior art.

With further reference to FIGS. 4 and 5, the adjusting device is put into operation by attaching the outer post (31) to a base (not numbered) and the inner post (33) to an equipment platform (not numbered). A person turns the threaded rod (12) to leave the locking block (18) from the middle post (32) to an unlock situation and turns the crank (43) to rotate the worm gear (42) that rotates and drives the spur gear (411). Thereby, the sprocket wheel (413) simultaneously rotates with the spur gear (411) and raises or lowers the middle post (32). When the middle post (32) moves upward, the secondary actuator (20) moves upward with the middle post (32) and the first guide roller (23) in the secondary actuator (20) pulls the inner post (33) upward via the cable (35). Since the stationary end of the cable (35) is securely attached to the bottom end of the outer post (31), the adjustment end of the cable (35) attached to the cable connector at the bottom of the inner post (33) moves upward. Because the inner post (33) extends out from the middle post (32) at the same time and at the same rate with that the middle post (32) extends out from the outer post (31), the equipment platform on the stand raises twice as quickly as the equipment platform on a stand with a conventional adjusting device or a single adjustable post. Because the inner post (33) retracts into the middle post (32) at the same time and at the same rate with that the middle post (32) retracts into the outer post (31), the equipment platform on the stand can be quickly lowered and positively controlled by the drive assembly (40). Lastly, when the height of the stand is achieved, the knob (121) is rotated to screw the threaded rod (12) tightly to abut and secure the middle tube (32) in a lock situation.

Although the invention has been explained in relation to its preferred embodiment, many other possible modifications and variations can be made without departing from the spirit and scope of the invention as hereinafter claimed.

What is claimed is:

1. An adjusting device adapted to a stand, the adjusting device comprising:

a three-part telescoping post (30) composed of an outer post (31), a middle post (32) slidably inserted into the outer post (31), an inner post (33) slidably inserted into the middle post (32) and a gap defined between the middle post (32) and the inner post (33);

a primary actuator (10) with inner cavity attached at a joint between the outer post (31) and the middle post (32) and having a top face, a bottom face, two side faces, a drive hole (111) defined in one side face, a locking hole (112) defined in the other side face of the primary actuator (10), and a post hole (13) defined longitudinally inside the primary actuator (10) from the top face to the bottom face;

a secondary actuator (20) with an inner cavity attached to a joint between the middle post (32) and the inner post (33) and having a top edge, a bottom edge, an upper hole (22) defined in the top edge, a lower hole (222) defined in the bottom edge to align with the upper hole (22), a post passage defined inside the inner cavity between the upper hole (22) and the lower hole (222), and a pair of first guide rollers (23) respectively mounted inside the inner cavity at opposite sides beside the post passage;

a driving device (40) mounted in the primary actuator (10) and having: a driver (41) with multiple sprockets rotatably secured inside the primary actuator (11); a worm gear (42) penetrating into the primary actuator (11) via the drive hole (111) to engage and drive the driver (41); and a crank (43) attached to the worm gear (43) to drive the worm gear (42) to rotate, wherein the outer post (31) with a top end and a bottom end (34) is firmly mounted inside the post hole (13) at the top end;

the middle post (32) with a top end penetrates through the post hole (13) and firmly attached to the secondary actuator (20) at the top end and having multiple sprocket holes (322) defined on the middle post (32) to engage the sprockets of the sprocket wheel (413) of the drive assembly (40); and the inner post (33) with a bottom end (331) extends through the passage in the secondary actuator (20);

a cable (35) attached to the bottom end (34) of the outer post (31), passing through the gap between the middle post (32) and the inner post (33) to reach the secondary actuator (20), reeving around one of the first guide rollers (23), attached to the bottom end (331) of the inner post (33) by means of penetrating through the gap, diametrally passing through bottom (331) of the inner post (33) and the gap between the middle post (32) and the inner post (33) to reach the secondary actuator (20), reeving around the other first guide roller (23), passing through the gap again and attached to the bottom end (34) of the outer post (31); and a locking assembly mounted on the primary actuator (10) to selectively fasten the middle post (32) of the three-part telescoping post (30) via the locking hole (112).

2. The adjusting device as claimed in claim 1, wherein the primary actuator (10) further has a lock recess (14) defined to communicate the locking hole (112) and the post hole (13); and the locking assembly comprises:

a threaded rod (12) having a knob (121) to insert into the locking hole (112);

a stationary block (17) immovably secured inside the lock recess (14) and having a threaded hole (171) to engage with the threaded rod (12); and a locking block (18) movably accommodated inside the lock recess (14) and pushed by rotating the knob (121) to abut with the middle post (32) of the three-part telescoping post (30).

3. The adjusting device as claimed in claim 1, wherein the primary actuator (10) further comprises:

a spindle bracket (113) with a pivot hole formed on the inner cavity of the primary actuator (10) and the pivot hole aligning with the drive hole (111) to secure the worm gear (42); and a bearing (14) protruding from the inner cavity of the primary actuator (10) near the spindle bracket (113);

wherein the driver (41) is composed of a spur gear (411) with a central shaft secured on the bearing (114) and a sprocket wheel (413) attached on the central shaft to rotate with the spur gear (411) and selectively engage with the sprocket holes (322) of the middle post (32).

4. The adjusting device as claimed in claim 2, wherein the primary actuator (10) further comprises:

a spindle bracket (113) with a pivot hole formed on the inner cavity of the primary actuator (10) and the pivot hole aligning with the drive hole (111) to secure the worm gear (42); and a bearing (114) protruding from the inner cavity of the primary actuator (10) near the spindle bracket (113);

wherein the driver (41) is composed of a spur gear (411) with a central shaft secured on the bearing (114) and a sprocket wheel (413) attached on the central shaft to rotate with the spur gear (411) and selectively engage with the sprocket holes of the middle post (32).

5. The adjusting device as claimed in claim 4, wherein the each first guide roller (23) further has an annular cable groove (231) defined to receive the cable.

6. The adjusting device as claimed in claim 5, in which two keys (221) are oppositely formed on inner wall of the upper hole (22); and two keyways (332) defined on the inner post (33) to correspond with the keys (221) of the secondary actuator (20) to keep the inner post (33) steady move inside the secondary actuator (20).

7. The adjusting device as claimed in claim 6, wherein a through hole (131) is defined on the top face of the primary actuator (10) to communicate with the post hole and a securing hole (132) is defined on the bottom face to communicate with the post hole;

a key (133) is formed on walls of the through hole (131); and a keyway (321) defined on the middle post (32) to correspond with the key (133).

8. The adjusting device as claimed in claim 7, wherein a pair of second guide rollers (24) is mounted below the pair of first guide rollers (23) in the inner cavity of the secondary actuator (20) at opposite sides beside the post passage.

\* \* \* \* \*